United States Patent [19]  [11] 4,013,610
Tomohiro et al.  [45] Mar. 22, 1977

[54] SPARINGLY GAS-PERMEABLE SYNTHETIC RESIN COMPOSITIONS

[75] Inventors: Akira Tomohiro, Nara; Kenzo Kaneko, Toyonaka, both of Japan

[73] Assignee: Takeda Chemical Industries, Ltd., Japan

[22] Filed: June 19, 1975

[21] Appl. No.: 588,166

[30] Foreign Application Priority Data

June 24, 1974 Japan .............................. 48-72526

[52] U.S. Cl. ........................... 260/37 EP; 260/37 N; 260/38; 260/39 R; 260/40 R; 260/42.14; 260/42.15; 260/DIG. 41
[51] Int. Cl.$^2$ ...................... C08K 3/40; C08K 9/02
[58] Field of Search ................ 260/42.14, DIG. 41, 260/42.15, 37 N, 37 EP, 38, 39 R, 40 R

[56] References Cited

UNITED STATES PATENTS 3,499,955  3/1970  Shannon ........................ 260/42.14
3,701,750  10/1972  Pomalti ......................... 260/42.14

OTHER PUBLICATIONS

Oleesky et al., Handbook of Reinforced Plastics, Reinhold Pub. Corp. New York, 1964, pp. 151–152.

Primary Examiner—James H. Derrington
Attorney, Agent, or Firm—Wenderoth, Lind & Ponack

[57] ABSTRACT

Synthetic resin compositions prepared by blending resin with the surface-treated glass flakes obtained by treating glass flakes with an inorganic acid have an excellent resistance against gas-permeability.

5 Claims, No Drawings

SPARINGLY GAS-PERMEABLE SYNTHETIC RESIN COMPOSITIONS

This invention relates to a sparingly gas-permeable synthetic resin composition.

Heretofore, synthetic resins have been in common usage as packaging materials for wrapping food, pharmaceutical products, cosmetic articles, electrical appliances, machinery components and other products but have proved unsatisfactory in many instances insofar as the quality maintenance of such wrapped prodducts is concerned because these synthetic resins are permeable, though in minor measures, to water vapor, oxygen gas, carbon dioxide gas, aromas, organic solvents and so on. Some amount of research aimed at obviating those disadvantages of synthetic resins has also been made. For example, a technique is known which comprises impregnating or filling a synthetic resin with glass flakes in order to reduce the gas-permeability of the resin material (Kogyo Zairyo (Engineering materials) 14, 45–49(1966)). However, synthetic resins simply impregnated with glass flakes are not sufficiently satisfactory, although their resistance to gas permeation is higher than the unimpregnated synthetic resins.

Under the circumstances just depicted, we made an intensive research and ultimately succeeded in attaining a synthetic resin material with excellent gas-permeation resistance by blending synthetic resin with the surface-treated glass flakes obtained by treating glass flakes with an inorganic acid or further coating the surface-treated glass flakes with a silane-coupling agent (silicon-type coupling agent).

Thus the principal object of the present invention is to provide a resin composition having an excellent resistance to gas-permeation.

As the glass flakes to be blended in the present resin composition, those of varied compositions can be employed. The size of the glass flakes to be blended in the present resin composition is virtually optional, but excessively fine flakes provide only a low gas permeation resistance. As the glass flakes are often crushed into small pieces at the time of blending and molding, it is preferable to use great size glass flakes or to use a blending and molding methods which do not crush the glass flakes. It is preferable that at least 50 percent of glass flakes in the resin composition have a size ranging of about 10 to 325 mesh.

The surface-treatment of glass flakes is carried out by contacting glass flakes with an inorganic acid, preferably followed by washing the resultant glass flakes.

The aforesaid inorganic acid is exemplified by hydrochloric acid, sulfric acid, nitric acid, phosphoric acid and other mineral acids, hydrochloric acid being especially desirable.

In the contacting procedure of glass flakes with an inorganic acid, the inorganic acid may be used after dilution with water or with an organic solvent compatible with water, e.g. methanol, ethanol or the like.

In such cases, the concentration of acid is optional, but pH of the acid solution is preferably not higher than 1.0. While the contacting operation may be carried out at room temperature, it is more desirable to effect the contacting under heating, usually at a temperature of 50° C up to the boiling point of the inorganic acid solution. The contacting time depends upon the temperature and the pH of acid solution, although a period of about 10 minutes to 10 hours is usually appropriate and sufficient. It is preferable that the resulting glass flakes are then washed with, for example, water, alcohol (e.g. methanol, ethanol, etc.), aqueous alkaline solution (e.g. sodium bi-carbonate, sodium hydroxide, potassium hydroxide, etc.) and so forth. By way of illustration, 200 g. of glass flakes are added to 1000 ml. of 5 percent hydrochloric acid and the system is heated at about 90° C for 1 hour. Then, the glass flakes are collected by filtration, washed with water and dried.

The specially surface-treated glass flakes thus obtained are then subjected to silane-coating procedure, if necessary. The silane coating is carried out by contacting the specially surface-treated glass flakes with a silane coupling agent.

The silane coupling agent (silicon type coupling agent) is an organic silicon compound monomer having two different functional groups, one of which being e.g. methoxy group, ethoxy group, silanol group, etc. which are to be reacted with inorganic substance (e.g. glass, metal, siliceous sand, etc.) and the other of which being e.g. vinyl group, epoxy group, methacryl group, amino group, mercapto group, etc. which are to be reacted with organic substance (e.g. various synthetic resines, etc.). As examples of said silane coupling agent, there may be mentioned such commercial silane coupling agents as vinyl triethoxysilane, γ-aminopropyltriethoxysilane, glycidoxypropyltrimethoxysilane, γ-methacryloxypropyltrimethoxysilane, n-β-(aminoethyl)-γ-aminopropyltrimethoxysilane, vinyl-tris-(β-methoxyethoxy)silane, methacrylate cation-silanes and so on.

The silane coating is usually carried out as follows.

For example, the silane coupling agent is dissolved in a suitable solvent (e.g. water, methanol, ethanol, benzene, toluene, xylene, etc.) to a concentration of about 0.5 to 30 percent and the glass flakes pre-treated with an inorganic acid are dipped therein at room temperature for about 10 minutes to about 3 hours. The flakes are then recovered by filtration and dried. Aside from the above procedure, any procedure known for the coupling treatment of glass with a silane compound can be employed.

The specially-treated glass flakes thus obtained are then used to impregnate a synthetic resin matrix.

The synthetic resin to be thus impregnated may be thermoplastic, e.g. polymethyl methacrylate, polyvinylalcohol resin (vinylon), polyamide resin (nylon), polyvinyl chloride, polyvinylidene chloride, polyvinylidene fluoride, polyester, polystyrene, polyethylene, polypropylene, polyurethane, etc., or thermosetting, e.g. melamine, polyester, urea, phenol, epoxy and other resins. While some of the synthetic resins are already sparingly gas-permeable, their gas-impermeability can be further improved by the treatment of this invention.

Although the amount of glass flakes embedded in resin is not critical, a deficiency is not conducive to a satisfactory gas-impermeability, while an excess of glass flakes results in brittleness of molded resin. Thus, the preferred level of impregnation if 0.5 to 70 percent and, for still better results, 5 to 50 percent of the total composition.

The impregnation of synthetic resin may be carried out in a conventional manner. For example, a typical process comprises blending glass flakes mechanically with synthetic resin and molding the composition into a desired shape in a routine manner, e.g. by means of a conventional extruder, injection molding machine, compression molding machine or the like. An alternative feasible process comprises previously dispersing glass flakes evenly in resin to be formed into a film by the known casting method and, then, casting the composition to obtain the desired film. Still another process may comprise heating the monomer to partially polymerize it, dispersing glass flakes in the resultant viscous slurry, casting the slurry onto a flat plate and causing it to post-cure. All that is necessary is that glass flakes be admixed appropriately with a synthetic resin in pelleted, powdery or molten state prior to molding and, then, the resin-glass flake composition be molded into a contemplated shaped article.

Since the sparingly gas-permeable resin composition of this invention provides shaped articles with only very low gas-permeability, it can be used to improve the quality of not only packaging materials such as films but also heat-insulations and architectural materials of synthetic resin foams, synthetic resin bottles and other containers.

Furthermore, according to this invention, the conventional molding processes for synthetic resins can be employed as they are without modifying them in any manner. Moreover, despite the fact that the synthetic resin has been impregnated with glass flakes, its mechanical properties, clarity, thermo-forming properties, heat sealability, extendability, rigidity, color, etc. are substantially not affected. Rather, since a ultraviolet-screening action can be imparted to resin, this invention provides a synthetic resin composition suited for the packaging or containment of products vulnerable to the attack of ultraviolet light. Furthermore, because the invention helps increase the glass-transition point of resin by about 20° centigrade, it is possible to enhance the heat resistance of resins, e.g. vinyl resins, which are liable to thermal deformation. Further, the resin composition of the present invention has an excellent dimensional stability and incombustibility.

The evaluation of whether a synthetic resin composition is gas-impermeable or not can be made by the computation of its gas permeation coefficient. For example, this invention was applied to polymethyl methacrylate to prepare a film by the casting method and the oxygen permeability coefficient of the film was computed.

It was found that the coefficient was about one-fifth of the coefficient of unimpregnated control film. It means that there was a reduction of gas permeability to one-fifth of the original value.

The following examples will serve to further illustrate the method of the present invention with no intention of limiting the scope of the present invention thereto.

EXAMPLE 1

200 grams of glass flakes, 16 to 48 mesh (1000 $\mu$ to 297 $\mu$), were boiled in 1,000 ml. of 5 % hydrochloric acid (pH: 0.17) for 1 hour after which they were collected by filtration and washed with water.

After drying at 105° C for 10 hours, the flakes were immersed in 1000 ml. of a 1.5 % aqueous solution of vinyltriethoxysilane at room temperature (25° C) for 1 hour. The flakes were recovered by filtration and dried at 105° C for 8 hours. The resultant glass flakes were suspended in a benzene solution of polymethyl methacrylate to give the concentrations of 5, 10, 20 and 30 weight percents based on the resin and each suspension was cast onto a flat glass plate and allowed to stand overnight. The resultant film, about 150 microns thick, was dried at room temperature for 3 days and, then, its permeability to water vapor was measured by means of a Honeywell water-vapor permeability tester. The result is set forth in the following table.

| Level of addition of treated glass flakes,% | Permeability to water vapor, g. 0.1 mm/m$^2$ . 24 hrs. |
|---|---|
| 5 | 86 |
| 10 | 54 |
| 20 | 17 |
| 30 | 9 |

The above resin composition containing glass flakes was ignited at a temperature lower than the melting point of the glass flakes for 3 to 4 hours, whereby only the glass flakes resulted. The resulting glass flakes were sieved and it is proved that the size of the glass flakes impregnated in the resin composition is almost the same with that of the used glass flakes.

EXAMPLE 2

The glass flakes treated with hydrochloric acid in the same manner as Example 1 were further treated with γ-methacryloxypropyltrimethoxysilane by a procedure similar to that described in Example 1. The thus-treated glass flakes were blended with polyvinyl chloride powder and the resultant mixture was formed into a film about 200 $\mu$ thick by means of a hot press. The oxygen gas permeability of this film was measured by means of a Lyssy gas-permeability tester. The results are set forth below.

| Level of addition of treated glass flakes, % | Permeability to oxygen gas cc.0.1mm/m$^2$ . 24 hrs. |
|---|---|
| 0 | 26 |
| 10 | 16 |
| 30 | 4 |

The size of the glass flakes impregnated in the resin compositions is as follows:

| | |
|---|---|
| − 150 mesh | 49 % |
| 150 − 325 mesh | 47 % |

EXAMPLE 3

To 200 g. of glass flakes, of which a 16 to 48-mesh fraction accounted for 70 percent, was added 1,000 ml. of 5 % hydrochloric acid (pH; 0.17). The system was boiled for 1 hour, after which the glass flakes were recovered by filtration and washed with water. The flakes were then dried at 105° C and treated with γ-methacryloxypropyltrimethoxysilane or γ-aminopropyltriethoxysilane in the same manner as Example 1. These treated glass flakes were blended with polyethylene pellets and the composition was pelleted. The glass flake-containing pellets were then molded by means of an injection molding machine of the conventional design into a container with a capacity of about 20 ml.

Calcium chloride was put into this container which was then sealed with aluminum foil and the container was held at 40° C and a relative humidity of 90 percent. The permeability to moisture of the container was measured.

| Method of treating glass flakes | Level of addition, % | Amount of water vapor permeation, mg/piece/day |
| --- | --- | --- |
| Untreated | 30 | 0.63 |
| Treated with hydrochloric acid and γ-methacryloxypropyltrimethoxysilane | 30 | 0.43 |
| Treated with hydrochloric acid and γ-aminopropyltriethoxysilane | 30 | 0.39 |
| Treated with acid only | 30 | 0.45 |

The size of the glass flakes impregnated in the resin compositions is as follows.

| | |
| --- | --- |
| − 150 mesh | 15 % |
| 150 − 325 mesh | 56 % |

EXAMPLE 4

The glass flakes treated with acid in the same manner as Example 3 were further treated with γ-methacryloxypropyltrimethoxysilane by a procedure similar to that described in Example 1. The glass flakes were then blended with polystyrene and the composition was processed into glass flake-resin pellets by means of a pelleting machine. The pellets were molded into a container in the same manner as Example 3 and the moisture permeability of the container was measured. The result is shown below.

| Method of treating glass flakes | Level of addition, % | Amount of water vapor permeation, mg./piece/day |
| --- | --- | --- |
| Untreated | 30 | 18.6 |
| Treated with hydrocloric acid and γ-methacryloxypropyltrimethoxysilane | 30 | 9.0 |
| Treated with acid alone | 30 | 10.2 |

The size of the glass flakes impregnated in the resin compositions is as follows.

| | |
| --- | --- |
| − 150 mesh | 14 % |
| 150 − 325 mesh | 57 % |

EXAMPLE 5

The glass flakes treated with acid and γ-methacryloxypropyltrimethoxysilane in the same manner as Example 2 were suspended in a benzene solution of polymethyl methacrylate and the suspension was cast into a film on a glass plate. The permeability of the resultant film to water vapor was measured. The results are set forth below.

| Level of addition of glass flakes, % | Permeability to water vapor, g. 0.1 mm/m². 24 hrs. |
| --- | --- |
| No glass flakes added | 140 |
| 5 | 100 |
| 10 | 70 |
| 20 | 40 |
| 30 | 25 |
| 50 | 20 |

The size of the glass flakes impregnated in the resin composition is almost the same with the used glass flakes.

EXAMPLE 6

The glass flakes treated with hydrochloric acid as in Example 1 were further treated with vinyl-tris-(β-methoxy)-silane in the same manner as Example 2, followed by the addition of 20 % of polymethyl methacrylate. The composition was cast into a 200 μ-thick film and the water-vapor permeability of the film was measured. The water-vapor permeabilities obtained by using glass flakes treated with acid alone or untreated glass flakes are also shown below.

| Method of treating glass flakes | Permeability to water vapor g.0.1 mm/m². 24 hrs. |
| --- | --- |
| Treated with hydrochloric acid and vinyl tris(β-methoxy)silane | 21 |
| Treated with hydrochloric acid | 40 |
| Untreated | 84 |

The size of the glass flakes impregnated in the resin composition is almost the same with that of the used glass flakes.

EXAMPLE 7

To 7.5 ml. of a 5 % aqueous solution of hydrochloric acid containing 5 % of alcohol were added 1.5 g. of glass flakes of the sizes indicated in the following table and each composition was boiled for 1 hour. The glass flakes were then recovered by filtration and washed with water. After drying at 105° C for 10 hours, the glass flakes were dipped in a 1.5 % aqueous solution of glycydoxypropyltrimethoxysilane at room temperature for 1 hour. The flakes were then recovered by filtration and dried for 8 hours.

The glass flakes thus obtained were suspended in a solution of 8.5 g. polymethyl methacrylate in 80 ml. benzene and the composition was cast on a glass plate into a 170 μ-thick film. The permeability of this film to water vapor was found to be as follows.

| Size of glass flakes | Permeability to water vapor, g.0.1 mm/m². 24 hrs. |
| --- | --- |
| Not added | 135 |
| 200 mesh pass | 120 |
| 145 − 200 mesh | 105 |
| 16 − 48 mesh | 40 |

The size of the glass flakes impregnated in the resin composition is almost the same with that of the used glass flakes.

EXAMPLE 8

Ten grams each of glass flakes, 16 to 48 mesh (1000 $\mu$ to 297 $\mu$), was added to 40 ml. each of aqueous solutions of various acid shown in the following table. The respective mixtures were heated at 90° C for 3 hours, and the glass flakes were collected by filtration, washed with water and dried at 105° C for 8 hours. Each lot of glass flakes thus obtained was suspended in a benzene solution of polymethyl methacrylate so as to make the content of the glass flakes 10 or 20 weight percent relative to the resin composition. Each suspension was cast onto a flat glass plate and allowed to stand overnight. The resulting films, about 200 $\mu$ thick, were dried at room temperature for 3 days and, then, each permeability to water vapor was measured by means of a Honeywell water-vapor permeability tester. The result is set forth in the following table.

| Acid and its concentration | Level of addition of treated glass flakes (%) | Permeability to water vapor g.0.1 mm/m². 24 hrs. |
|---|---|---|
| 10 % HCl | 10 | 55 |
|  | 20 | 46 |
| 70 % H$_2$SO$_4$ | 10 | 72 |
|  | 20 | 43 |
| 10 % H$_2$SO$_4$ | 10 | 67 |
|  | 20 | 57 |
| 10 % HNO$_3$ | 10 | 71 |
|  | 20 | 61 |
| Untreated | 10 | 108 |
|  | 20 | 84 |

The size of the glass flakes impregnated in the resin composition is almost the same with that of the used glass flakes.

EXAMPLE 9

2,000 Grams of glass flakes, 16 to 48 mesh (1000 to 297 $\mu$), were immersed into 10 liter of 10 % hydrochloric acid at 50° C for 5 hours, after which they were collected by filtration and washed with water. After drying at 105° C for 8 hours, the flakes were immersed into 10 l. of a 1.5 % aqueous solution of $\gamma$-aminopropyltriethoxysilane at room temperature (25° C) for 1 hour. The flakes were recovered by filtration and dried at 105° C for 8 hours. The resultant glass flakes were blended with 8 kg. of nylon-12 resin and the composition was pelleted by means of an extruder. The glass flake-containing pellets were then formed by means of an extrusion film-forming machine into a 300 $\mu$-thick film.

The oxygen gas permeability and permeability to water were measured by means of a Mocon gas-permeability tester (made by Modern Controls Inc. Company) and Honey-well water-vapor permeability tester. The results are set forth in the following table.

| Level of addition (%) | Permeability to oxygen gas cc.0.1 mm/m². 24 hrs. | Permeability to water vapor g.0.1 mm/m². 24 hrs. |
|---|---|---|
| 0 | 123 | 20.5 |
| 20 | 78 | 14.2 |

The size of the glass flakes impregnated in the resin compositions is as follows.

| - 150 mesh | 15 % |
|---|---|
| 150 - 325 mesh | 55 % |

What is claimed is:

1. A sparingly gas-permeable synthetic resin composition impregnated with surface-treated glass flakes obtained by contacting glass flakes with an inorganic acid solution at a pH not higher than 1.0 at a temperature of 50° C up to the boiling point of the inorganic acid solution.

2. A sparingly gas-permeable synthetic resin composition as claimed in claim 1, wherein an amount of glass flakes impregnated in the resin composition ranges from about 0.5 to about 70 weight % relative to the whole amount of the resin composition.

3. A sparingly gas-permeable synthetic resin composition as claimed in claim 1, wherein the surface-treated glass flakes are one obtained by coating the glass flakes with a silane coupling agent after the treatment of the glass flakes with an inorganic acid.

4. A sparingly gas-permeable synthetic resin composition as claimed in claim 3, wherein an amount of glass flakes impregnated in the resin composition ranges from about 0.5 to about 70 weight % relative to the whole amount of the synthetic resin composition.

5. A sparingly gas-permeable synthetic resin composition as claimed in claim 1 wherein the temperature of treatment is at least 90° C.

* * * * *